United States Patent
Zaguri

(10) Patent No.: US 8,015,181 B2
(45) Date of Patent: Sep. 6, 2011

(54) SYSTEM FOR PROVIDING ENHANCED SEARCH RESULTS ON THE INTERNET

(75) Inventor: Edud Zaguri, Kibutz Netzer Sireni (IL)

(73) Assignee: Conduit, Ltd

(*) Notice: Subject to any disclaimer, the term of this patent is extended or adjusted under 35 U.S.C. 154(b) by 512 days.

(21) Appl. No.: 11/820,581

(22) Filed: Jun. 19, 2007

(65) Prior Publication Data

US 2008/0319977 A1 Dec. 25, 2008

(51) Int. Cl.
*G06F 17/30* (2006.01)

(52) U.S. Cl. .......... 707/721; 707/999.002; 707/999.003; 707/999.005; 707/716; 707/727

(58) Field of Classification Search .................. 707/2, 3, 707/4, 5, 6, 10, 999.002–999.006, 721, 727
See application file for complete search history.

(56) References Cited

U.S. PATENT DOCUMENTS

| 7,349,894 B2 * | 3/2008 | Barth et al. ........................ 707/3 |
| 7,444,358 B2 * | 10/2008 | Paczkowski et al. ...... 707/104.1 |
| 2002/0099605 A1 * | 7/2002 | Weitzman et al. ............... 705/14 |
| 2006/0161534 A1 * | 7/2006 | Carson et al. ..................... 707/3 |
| 2008/0162475 A1 * | 7/2008 | Meggs et al. ..................... 707/6 |

\* cited by examiner

*Primary Examiner* — Apu Mofiz
*Assistant Examiner* — Monica Pyo

(57) ABSTRACT

Apparatus and a method that control the number of sponsored links that are presented in search result webpages in response to a search string presented by a user, based on the past behavior of users to presentations of result in response to the same search string. When this past behavior indicates that users tend to select sponsored links, the number of sponsored links in the results sent to the user is increased, thereby a more responsive presentation. In addition to sending results with a controlled number of sponsored links, the apparatus and the method account for the response of the user so as to include the user's behavior in the information about past behavior of users.

19 Claims, 3 Drawing Sheets

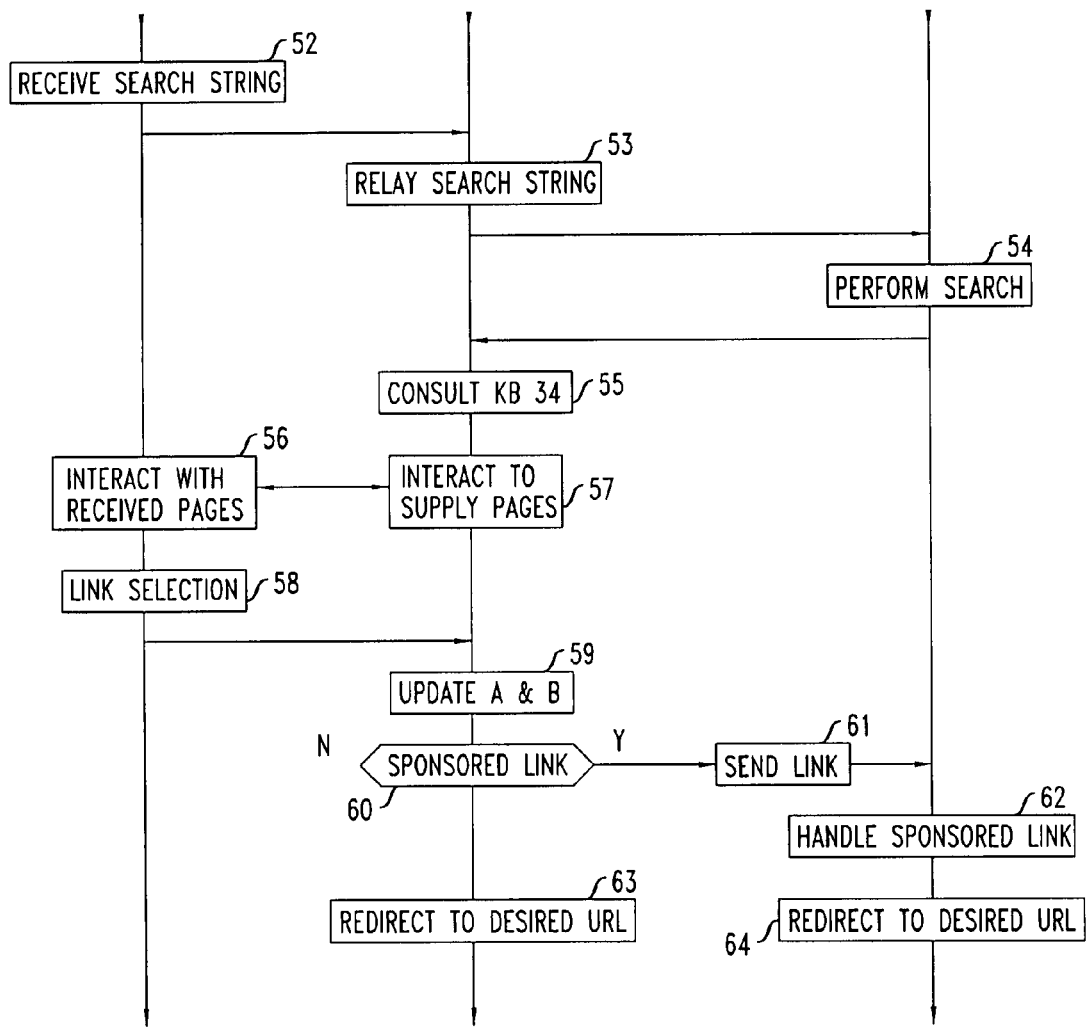

SYSTEM FOR PROVIDING ENHANCED SEARCH RESULTS ON THE INTERNET

FIELD OF THE INVENTION

The present invention relates to a system for use with the Internet and, more particularly relates to searching for information on the Internet.

BACKGROUND OF THE INVENTION

Today's Internet has a number of search engine sites (SESs) that offer users that visit an SES the ability to search via the Internet or, more accurately, to search through data about information available on the Internet that previously was collected by the SES. This is accomplished by the SES providing the user's browser with a webpage that contains one or more text boxes that allow the visiting user to populate with a search query. When the user clicks on a designated control element (or one of a number of control elements), the information within the text boxes is sent to the SES, the SES searches through its database, and returns to the user's browser a response web page. The web page typically contains a list of items, and each item contains a visible portion and a hidden portion. Normally, the hidden portion is a URL of a website (or merely the IP address) that is responsive to the search query in whatever sense the SES concludes to be valid, and the visible portion is some text that describes the website (and also typically presents the URL as part of the text).

More often than not, the number of links in the list of items that is created in response to a query is large, so the SES constructs a first response web page and presents it to the user. The user has the choice of selecting one of the links in that webpage, or requesting another web page from the SES which would contain other links that are responsive to the query. The question of the order in which the links are sorted in order to present to the user in the first, second, third, etc. response pages presents a quandary (or challenge) because users often do not peruse through the entire list represented by the collection of different response web pages. Therefore, to the extent that web site want to be selected, those web sites that are included in the first response web page, and particularly at the top of and/or at the bottom of the response page, have an advantage over those web sites that are included in the second response web page, and the latter have an advantage over web sites that are included in subsequent response web pages. In connection with later web pages, again, those that are displayed at the top and at the bottom of the page have an advantage over the ones in between.

Some SESs order the list of links by a measure of probability that the SES establishes relative of the relevance of the item to the search query. That is, those SESs apply an algorithm which determines that some items are considered more responsive to the query than other items, and the more responsive links are given a higher probability value and are placed higher (earlier) in the list.

At least some of the SESs transformed this challenge into a business opportunity by introducing the notion of presenting responses in two groups: websites that are responsive to the search query and which are "sponsored" websites, and websites that are responsive to the search query and which are not sponsored websites. The sponsored websites are given preferential treatment in that they are displayed more prominently (such as at the top of at the bottom of a response webpage), and in return for the more prominent treatment the owners of those websites typically pay the SES for each time a user clicks on the owner's sponsored link. This imposes a need for the SES to know each time a sponsored link is chosen by the user, and that is accomplished by the SES modifying the hidden portion of the sponsored items in the list that it presents to the user in response to a query. Specifically, rather than specifying the URL of the link, the hidden portion of the sponsored links contains a code that is sent back to the SES when a user selects a sponsored link. The code identifies the link to the SES, which allows the SES to direct the user's browser to the appropriate URL of the selected sponsored link. It also allows the SES to account for the fact that a sponsored link was selected by the user, and get paid accordingly.

While it appears that commercial considerations would drive an SES to show as many sponsored links as possible (thereby increasing the chances that users will click on a sponsored website and thus increase the revenues garnered by the SES), the SES also has an interest in having users perceive the SES as a fair and impartial entity that responds to a search query with results that are not tainted by the commercialism associated with sponsored links. It is important, therefore, to strike a proper balance.

SUMMARY

An advance in the art is realized by apparatus and a method that control the number of sponsored links that are presented in search result webpages in response to a search string presented by a user, based on the past behavior of users to presentations of result in response to the same search string. When this past behavior indicates that users tend to select sponsored links, the number of sponsored links in the results sent to the user is increased, thereby a more responsive presentation. In addition to sending results with a controlled number of sponsored links, the apparatus and the method account for the response of the user so as to include the user's behavior in the information about past behavior of users. Illustratively, the number of sponsored links is control based on a table of number of times that a sponsored link had been selected for the given search string relative to number of times that the search string has been presented by users.

BRIEF DESCRIPTION OF THE DRAWINGS

FIG. 4 presents a flowchart for some of the operations carried out in the FIG. 3 embodiment.

DETAILED DESCRIPTION

Figure 1:
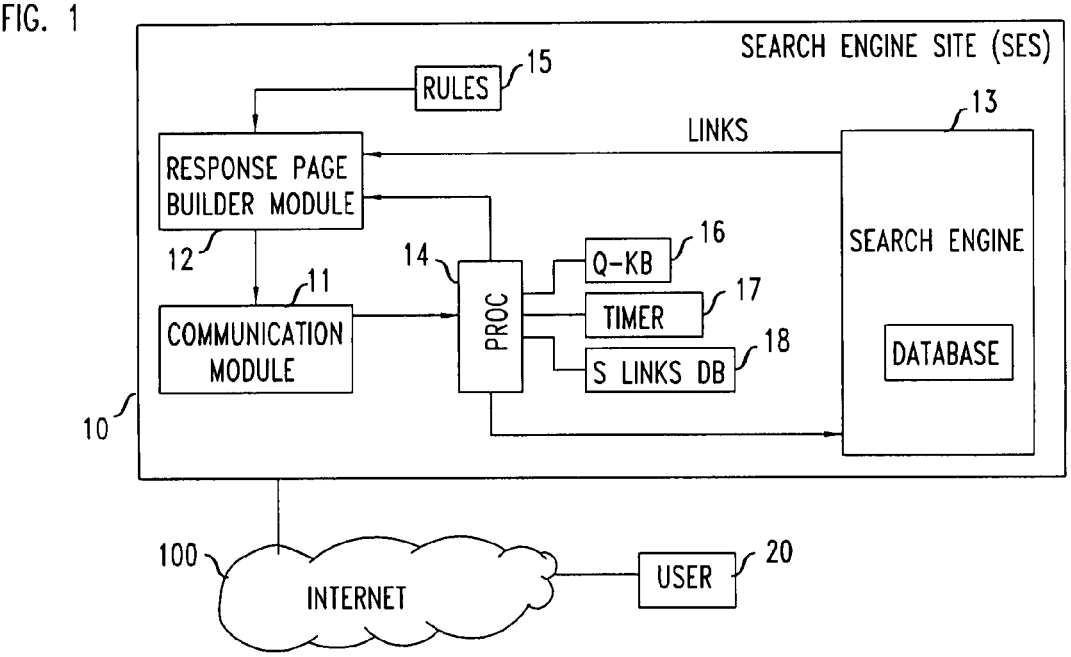
FIG. 1 depicts one embodiment of an arrangement in accord with the principles disclosed herein.

FIG. 1 depicts an arrangement where user 20 is connected to a search engine site (SES) 10 via the Internet 100. SES 10 comprises communication module 11 that receives messages from Internet 100 and passes them to processor 14. A message may include a search string such as "flat screen TVs" and information that informs the SES that the string represents a request to provide a list of links that pertain to "flat screen TVs." A message may also be something other than a search request, such as a request to present a next webpage. When the message is a search request, processor 14 extracts the search string from the message and passes the extracted information to search engine 13. Engine 13 executes the requested search using its associated database and passes the results to response page builder module 12, which includes a memory for storing all of the results extracted by engine 13. Under control of rules element 15 and processor 14, builder module 12 constructs a web page and sends the constructed response page to user 20, via communication module 11 and Internet 100.

When the message that module 11 receives is other than a search request, for example, a request to provide a succeeding webpage pertaining to the search string under consideration, processor 14 directs builder module 12 to provide the requested information.

When the message that comes to module 11 is flagged as a selection of a sponsored link, for example, a code corresponding to a particular selected sponsored link, processor 14 accesses sponsored links database 18, obtains therefrom a record corresponding to the received code, and from the retrieved record processor 14 extracts the URL of the sponsored link and sends it to the browser of user 20 to direct that browser to the specified URL. Processor 14 also updates the obtained record in the sponsored links database 18 to reflect the fact that the sponsored link was selected by user 20 so that the owner of the sponsored link can be billed appropriately at a later time.

In accord with the principles disclosed herein, the number of sponsored links that a user is shown in each webpage in response to a search that is based on a given search string is a function of the attractiveness of sponsored links to previous users who submitted the same search string. More particularly, the number of sponsored links that a user is shown in response to a search that is based on a given search string is based on the fraction of times that the same search string resulted in users selecting a sponsored link over a non-sponsored link.

Unfortunately, in the current mode of operations where an SES receives a positive indication of a selection only when the selection is of a sponsored link, information about whether the user selected a non-sponsored link can only be inferred.

Figure 2:
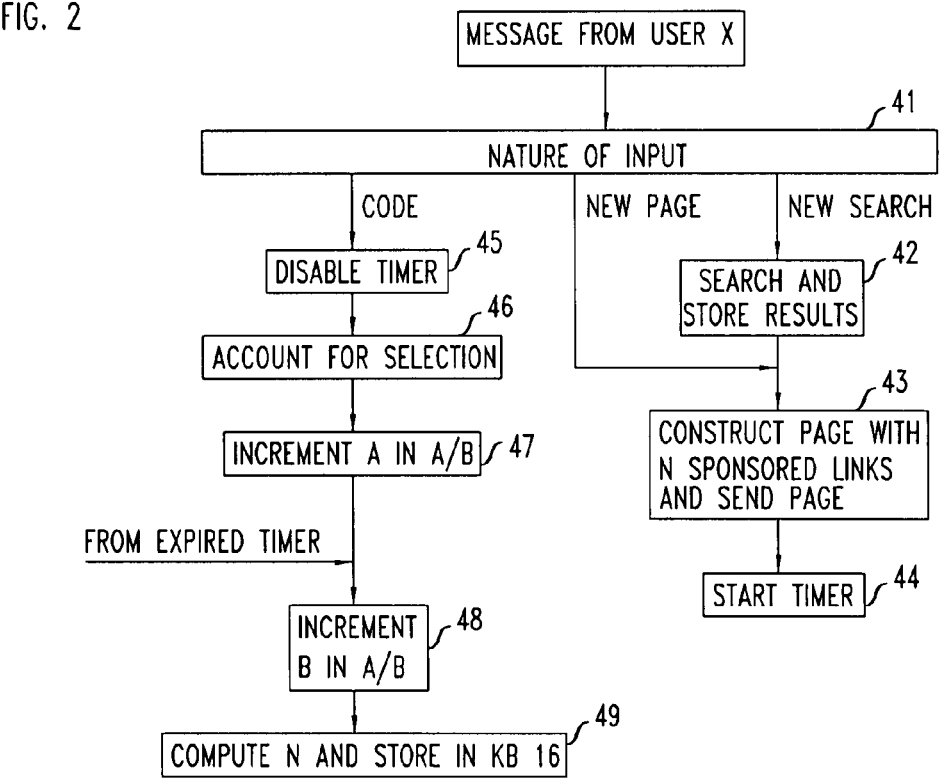
FIG. 2 presents a flowchart for some of the operations carried out by the FIG. 1 processor.

The above-outlined operation is depicted for a first illustrative example in FIG. 2, where the notion that the user selected a non-sponsored link is inferred from the fact that no other message was received within a preselected time period following the presentation of a page responsive to a search request. It is recognized that the inference may not always be valid because a user may have sent a search, received results, and abandoned the search without selecting any link; but in the normal course of operation, if the user has not abandoned the search altogether then the user does one of the following:

requests another page (i.e., continues to peruse the results),
sends a request to modify the search (i.e., which effectively is a new search),
selects a sponsored link (which causes a code message to be sent to the SES, or
selects a non-sponsored link.

In FIG. 2, the processor 14 process begins when a message is received from user X (e.g., user 20). At such times, control passes to step 41 where the nature of the input is ascertained. When the received message is the first message from user 20, it will be a request to execute a search for a particular search string. Control then passes to step 42 which performs the search and stores the results in the memory of element 12. Control then passes to step 43 where a webpage is constructed with a given number of sponsored link and sent to user 20 (as indicated above, these operations are carried out by elements 15 and 12 under control of processor 14).

In accord with the principles disclosed herein, that number, N, is obtained in the FIG. 1 apparatus by processor 14 retrieving a record from Query Knowledge Base (Q-KB) 16 for the search string, and extracting the number N from it. Illustratively, each record is a tuple of the form: search_string:N:A:B, where A and B are integers corresponding to past dealings relative to the search_string. Integer B is the total number of times that this search string was requested to be searched—by any user—, and integer A is the number of times that a user followed such a requested search with a selection of a sponsored link.

Following step 43, control passes to step 44 wherein processor 14 initializes and starts timer 17 of the FIG. 1 apparatus. Timer 17 is a conventional device or a software module (basically, a down-counter) that outputs a trigger signal after a predetermined time interval following its start.

Unless user 20 chooses a non-sponsored link, it is expected that within the timer's interval, a message will arrive from user 20 requesting another page (that is based on the same search) or specifying a code that corresponds to a sponsored link.

If a message arrives that requests another page, control passes from step 41 to step 43 and the process continues as described above (noting that timer 17 is re-initialized and restarted).

If a message arrives which contains a code that corresponds to the selection of a sponsored link, control passes to step 45 which freezes timer 17 and passes control to step 46, where processor 14 accounts for the fact that a sponsored link was selected and modifies database 18, as disclosed above. Control then passes to step 47 which accesses the tuple in Q-KB 16, as described above, and integer A is incremented. Control then passes to step 48 where integer B is also incremented, and control then passes to step 49 which modified the value of N, if appropriate, as described in more detail below.

Lastly, if no message arrives at all prior to the expiration of timer 17, timer 17 sends a signal to processor 14 at the instant of its expiration, and control passes to step 48 where, as described above, integer B is incremented. Thus, the fraction A/B effectively describes the attractiveness of users selecting a sponsored link when results for a search on the given string are presented, as modified by the instant interaction with user 20.

Numerous different methodologies may be employed regarding the value of N. If, illustratively, a computation of N is undertaken after each click by a user, the method needs to include some hysteresis as shown, for example, in the following table.

| Value of N | Increment N if A/B reaches | Decrement N if A/B reaches |
|---|---|---|
| 3 | 0.34 | |
| 4 | 0.40 | 0.32 |
| 5 | 0.45 | 0.38 |
| 6 | | 0.43 |

Thus, for example, when the A/B exceeds 0.40 and N is increased to 5, it does not get decremented until A/B drops to 0.38.

Actually, there is no inherent need to re-compute N after each search. Rather, N might be computed only every so often and, conveniently, periodically. That is, N might be computed perhaps once a day, or once a week. With every computation of N, the values of A and B are advantageously reset to establish a true ratio for the recomputed value of N. In accord with this approach, no hysteresis is necessary, and the value of N that is selected might follow the following table.

| Value of N | Increment N if A/B reaches | Decrement N if A/B reaches |
|---|---|---|
| 3 | 0.30 | |
| 4 | 0.40 | 0.36 |
| 5 | 0.45 | 0.43 |
| 6 | | 0.46 |

It may be noted that the ratio threshold for incrementing the value of N increases as N increases, to account for the fact that when more sponsored links are presented, the likelihood that a sponsored link is selected is higher.

In the above-described methodology, a decision is made that a non-sponsored link was selected when, within the timer interval, no input is provided following presentation of search results.

Another embodiment in accord with the principles disclosed herein may be constructed that employs no timer but, instead, assumes that every presentation of a search result in response to a search string results in a click (selection of a presented link). In this embodiment, value B is incremented after each new search, and counter A is incremented whenever a message arrives which specifies that a sponsored link was selected.

Yet another embodiment in accord with the principles disclosed herein is realized by modifying the nature of the results that are sent to the user's browser. Specifically, rather than send links where non-sponsored links provide a URL for the user's browser to employ while sponsored links provide a code to be sent back to the provider of the responsive webpage (e.g., SES 10), in this embodiment all links—whether sponsored or non-sponsored—include a code back that is sent back to the provider of the responsive webpage. In this manner, affirmative data is available about each user selection.

Figure 3:
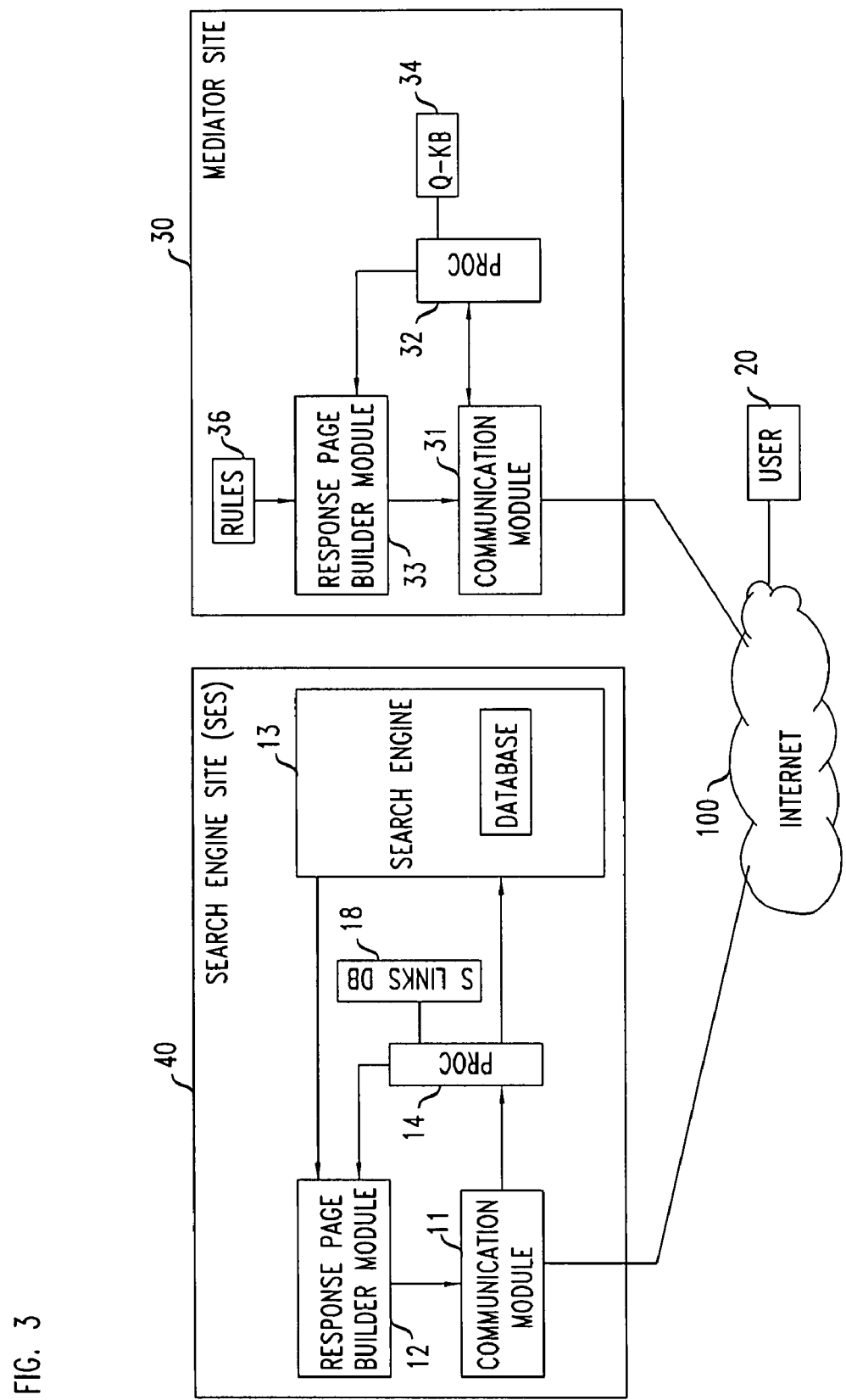
FIG. 3 depicts another embodiment in accord with the principles disclosed herein.

FIG. 3 presents a second illustrative arrangement in accord with the principles disclosed herein, which includes Internet 100, user 20, SES 40 and mediator site 30. In this embodiment, for illustrative purposes (and not because the embodiment requires it) all links are presented to the user with a code that is returned to mediator 30 when a link is selected by the user's browser.

The FIG. 3 arrangement may be such that a user sends a search string to SES 40, SES 40 performs the requested search, sends results to mediator 30, and leaves the interaction with the user to mediator 30—asking only that information about sponsored links be send back to SES 40. Alternatively, the FIG. 3 arrangement may be such that the user goes directly to mediator 30—such as through an installed toolbar—and mediator 30 uses SES 40 as merely the repository of the database associated with search engine 13. Here, too, mediator 30 may send information about selections of sponsored links to SES 40.

FIG. 4 presents the information flow among the user's browser, the mediator, and the SES in the arrangement where the user accesses mediator 30 directly but the business end of getting paid for sponsored links selections is handled in SES 40.

SES 40 is simpler than SES 10 in that it does not create individual response pages, and merely responds to a search request by outputting all responsive links—some of which are sponsored links that are appropriately flagged. That is, as illustrated in FIG. 4, the user's browser receives a search string (block 52) and sends it to mediator site 30 via Internet 100. Communication module 31 receives the string and processor 32 relays the search string (block 53) to SES 40 through Internet 100. Communication module 11 of SES 40 receives the search string, forwards it to processor 14, and processor 14 sends the string to search engine 13 wherein the search is performed (block 54). The search results are first stored in module 12 of SES 40, and then are sent via module 11 and Internet 100 to mediator site 30, where the results are stored in element 33. Mediator site 30 then consults its knowledge base 34 (block 55) to identify the number of sponsored links (N) that need to be used in constructing response pages (also stores the search string in the knowledge base on first occurrence of the string) and passes control to block 57, which interacts via Internet 100 with the user (block 56) to display to the user responsive web pages, each of which contains a N sponsored links.

As indicated above, in the illustrative embodiment of FIGS. 3 and 4, each link that is presented in webpages that are constructed (block 57) by processor 32, and elements 33 and 36,—whether sponsored or non-sponsored—includes a code that is sent back to mediator 30 by the user when the link is selected. Illustratively, the codes of sponsored links originate in database 18 of SES 40, whereas the codes of non-sponsored links are created by processor 32 of mediator 30.

When the user makes a selection (block 58), the code associated the selected link is sent to mediator 30, and processor 32 updates the A and B values (block 59). Specifically, only the B value is incremented when the selected link is a non-sponsored link, whereas both the A and the B values are incremented when the selected link is a sponsored link. Thereafter, when processor 32 concludes (block 60) that the received code is that of a sponsored link, it sends (block 61) the received code via nodule 31, Internet 100, and module 11, to processor 14 of SES 40. Otherwise, processor 32 sends a message to the user (block 63) to redirect the user's browser to the non-sponsored link that is associated with the non-sponsored link code that the user selected.

When SES 40 receives a code from mediator 30 that corresponds to a sponsored link it handles the business end of getting paid for having the user select a sponsored link, using database 18 (block 61) and then sends a message to the user (block 64) to redirect the user's browser to the sponsored link that is associated with the sponsored link code that the user selected.

It may be noted that nothing requires mediator site 30 to send the search string to a pre-specified SES. Rather, it can send the search string to an SES that is specified by the user, to an SES of its choosing, or to a number of SES sites.

In yet another use of the FIG. 3 arrangement mediator 30 handles the business end of getting paid for sponsored links selections. In such an embodiment mediator site 30 includes a sponsored links database akin to database 18 (of FIGS. 1 and 3) that is coupled to processor 32. The operation of site 30 in this embodiment is effectively the same as the operation of the FIG. 1 arrangement, except that site 30 delegates execution of the search on the presented search string to one or more SES sites. In this embodiment, it is the mediator site that has the business relationship with owners of sponsored links (rather the SES or SESs) and that means that processor 32 has to include the ability to identify sponsored links and insert the proper codes into the links that are presented to user 20. That is done in the same manner that SES's currently keep track of sponsored links, for example, by keeping a database of IP addresses that are associated with sponsored links.

Various modifications can be implemented, of course, without departing from the spirit and scope of this invention. For example, in the fourth embodiment, where site 30 creates codes for sponsored links processor 32 can create codes for both sponsored and non-sponsored links, and causing the browser of user 20 to always send a message to site 30.

Although that increases the traffic to site 30, it has the benefit not needing to infer when user 20 selects a non-sponsored link, which simplifies the apparatus and the method by eliminating the need for timer 47.

The invention claimed is:

1. A method executed in a system for controlling a number of sponsored links that are presented by a search engine to a user's apparatus via a network in response to a request from said user's apparatus to provide links responsive to a search string submitted by the user, where a link is information that specifies location address of a webpage, comprising the steps of:

obtaining a set of links that is responsive to said search string, said set including a plurality of sponsored links and a plurality of non-sponsored links;

constructing a webpage that includes a subset of links from said set, and said subset includes N sponsored links, where N is a number that is determined based on history of past link selections by users that provided said search string;

sending the constructed webpage to said user;

where, in contrast to a non-sponsored link, a sponsored link is a link that triggers a payment by one party to another party in consequence of a user of said users selecting said link;

augmenting said history based on a selection by said user in response to the sent webpage; and executing a process for modifying value of said N that takes into account said selection by said user, which determines whether to alter N based on a lookup table keyed to an approximate or actual ratio of selection in said history of sponsored links for said search string to total number of selections for said search string.

2. The method of claim 1 where said process is executed at a time that is independent of said selection by said user.

3. The method of claim 2 where said process is executed periodically.

4. The method of claim 3 where each execution of said process resets said history.

5. The method of claim 1 further comprising the steps of receiving said search string at a server; and said server causing a search to be made of one or more databases to retrieve said set of links.

6. The method of claim 5 where said steps of obtaining, constructing and sending are performed at a first website, which is controlled by an operator that is other than operator of said server.

7. The method of claim 1 where said steps of obtaining, constructing and sending are performed at a website that is specified by said user, which is different from a website that creates said set of links.

8. The method of claim 1 where said steps of obtaining, constructing and sending are performed at a website chosen without an explicit specification by said user.

9. A website arrangement including a communications module for interfacing with the Internet, a processor, and a first module for creating webpages to be sent to a user over the internet in response to a search request submitted by the user that specifies a search string, the improvement comprising a storage element that maintains records, each of which associates a search string with information regarding past selections by users who had submitted the associated search string, which information pertains to whether said users selected sponsored links, in contrast to having selected non-sponsored links, from among links sent to those users in response to the submitted associated search string, a second module for using said information in choosing a number N of sponsored links that said first module uses in creating the webpages;

where, in contrast to a non-sponsored link, a sponsored link is a link that triggers a payment by one party to another party in consequence of a user of said users selecting said link, and said processor augments said past selections based on a selection by said user in response to the sent webpage;

chooses value of N for each of the records in said storage element based on ratio of number of sponsored links associated with said record to number of both sponsored and non-sponsored links in said record; and executes a process for modifying value of said N that takes into account said selection by said user which determines whether to alter N based on a lookup table keyed to an approximate or actual ratio of selections in said past selections of sponsored links for said search string to total number of selections for said search string.

10. The arrangement of claim 9 where said processing module chooses said value of N for each of the records periodically.

11. The arrangement of claim 9 where said information consists of two integers whose quotient informs of number of times that sponsored links were selected relative to both sponsored and non-sponsored link that were selected.

12. The arrangement of claim 9 where said processor sends a webpage to the user in response to the search string specified by the user, which webpage contains a number of sponsored links that is proportional to a ratio of two integers in a record in said storage element with an associated search string that is the same as the search string specified by the user.

13. The arrangement of claim 9 where each record also includes a number-of-links integer, and said processor sends a webpage to the user in response to the search string specified by the user, which webpages contains a number of sponsored links that is proportional to the number-of-links integer in a record in said storage element with an associated search string that is the same as the search string specified by the user.

14. The arrangement of claim 13 further comprising a timer that is set when the webpage is sent to said user, and said processor concludes that the user selected a non-sponsored link when said timer expires before a message arrives from the user after then timer was set.

15. The arrangement of claim 9 further comprising a database, and said processor directs the received search string that is contained in the search request submitted by the user to said database.

16. The arrangement of claim 9 further comprising one or more databases, and said processor directs the received search string that is contained in the search request submitted by the user, via the Internet, to said one or more databases.

17. An arrangement comprising:

a first website that includes a database; and a second website that includes module for interfacing with the Internet, a processor, a storage element that maintains records, each of which associates a search string with information regarding past selections by users who had submitted the associated search string, which information pertains to whether said users selected sponsored links or non-sponsored links from among links sent to those users in response to the submitted associated search string, and a module for creating webpages to be sent to a user over the internet in response to a search request submitted by the user that specifies a search string, a module for
- using said information in choosing a number N of sponsored links that said module for creating webpages uses in creating the webpages based on ratio of number of sponsored links associated with said record to number of both sponsored and non-sponsored links in said record, where, in contrast to a non-sponsored link, a sponsored link is a link that triggers a payment by one party in consequence of a user of said users selecting said link,
- augmenting said past selections based on a selection by said user in response to the sent webpage, and
- executing a process for modifying value of said N that takes into account said selection by said user which determines whether to alter N based on a lookup table keyed to an approximate or actual ratio of selections in said past selections of sponsored links for said search string to total number of selections for said search string.

18. The arrangement of claim 17 where said first website is adapted to receive from the user a search request comprising said search string, to perform a search on said search string, and to send results of said search, over the Internet, to said second website, said module for creating webpages is adapted to create said webpages from said results sent by the first website and to send the created pages to said user, and said second website further includes a module that recognizes when said user selects a sponsored link from among links contained in said webpages sent to said user.

19. The arrangement of claim 17 where said second website is adapted to receive from the user a search request comprising said search string, and to send a corresponding request to said first website;

said first website is adapted to receive the search request from the second website, to perform a search on said search string, and to send results of said search, over the Internet, to said second website said module for creating webpages is adapted to create said webpages from said results sent by the first website and to send the created pages to said user, and said second website further includes a module that recognizes when said user selects a sponsored link from among links contained in said webpages sent to said user.

\* \* \* \* \*